United States Patent [19]

Jenkins et al.

[11] Patent Number: 5,887,712
[45] Date of Patent: Mar. 30, 1999

[54] COMPACT DISK CASE AND COMPACT DISK HOLDER THEREFORE

[76] Inventors: Charles L. Jenkins; Thalia D. Jenkins, both of 12358 Shore Ridge, Maryland Heights, Mo. 63043

[21] Appl. No.: 16,611

[22] Filed: Jan. 30, 1998

[51] Int. Cl.⁶ ...................................... B65B 85/57
[52] U.S. Cl. ...................... 206/307.1; 206/308.1
[58] Field of Search ............... 206/308.1, 308.3, 206/309, 310, 311, 312, 313, 307.1

[56] References Cited

U.S. PATENT DOCUMENTS

| | | | |
|---|---|---|---|
| 4,655,345 | 4/1987 | Drake et al. | 206/308.1 |
| 4,678,245 | 7/1987 | Fouassier | 206/308.1 X |
| 4,793,479 | 12/1988 | Otsuka et al. . | |
| 4,793,480 | 12/1988 | Gelardi et al. . | |
| 4,932,522 | 6/1990 | Milovich | 206/208.1 |
| 5,048,680 | 9/1991 | Fitzpatrick . | |
| 5,097,946 | 3/1992 | Emrich | 206/308.1 |
| 5,191,977 | 3/1993 | Markovitz | 206/308.1 |
| 5,334,904 | 8/1994 | Kramer . | |
| 5,377,825 | 1/1995 | Sykes et al. . | |
| 5,477,960 | 12/1995 | Chen . | |
| 5,542,531 | 8/1996 | Yeung . | |
| 5,549,199 | 8/1996 | Lindsay . | |
| 5,575,387 | 11/1996 | Gelardi . | |
| 5,575,388 | 11/1996 | Bolognia et al. . | |
| 5,586,651 | 12/1996 | Krummenacher . | |
| 5,590,769 | 1/1997 | Lin . | |
| 5,609,249 | 3/1997 | Cheng . | |
| 5,626,225 | 5/1997 | Joyce, Jr. . | |

*Primary Examiner*—Jacob K. Ackun
*Attorney, Agent, or Firm*—Polster, Lieder, Woodruff & Lucchesi

[57] ABSTRACT

Briefly stated, a compact disk/diskette case is provided. The case includes a central section which removably receives a plurality of CD drawers, a top section which defines at least one bay sized to received a standard 3.5" diskette, and a bottom section which slidably receives a storage drawer. The case includes adhesive feet on its bottom surface to enable the case to be mounted to a computer monitor.

Each the CD drawer includes a tray and a door. The tray has a hollow boss which is sized to enable a CD to be slidably journaled about the boss. The door is pivotally connected to the tray and has a projection which is received in the hollow portion of the tray boss. The door projection and the tray boss engage each other to removably hold a CD in the drawer without positively engaging the CD. The two sides of the tray are identical, and the drawer includes a second door which cooperates with a boss on the second side of the tray to hold a second CD in the drawer. Thus, each drawer holds two CDs.

17 Claims, 7 Drawing Sheets

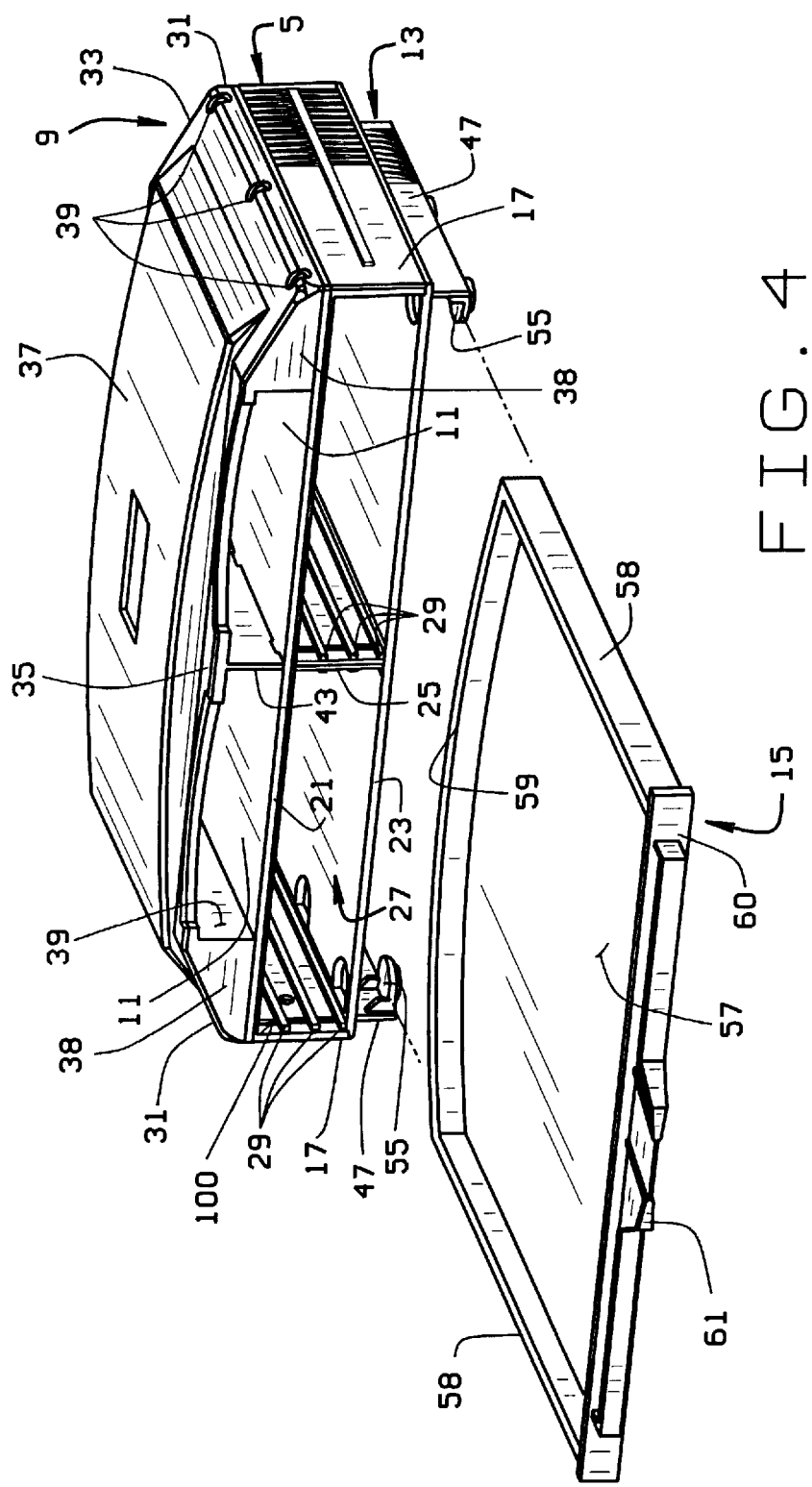

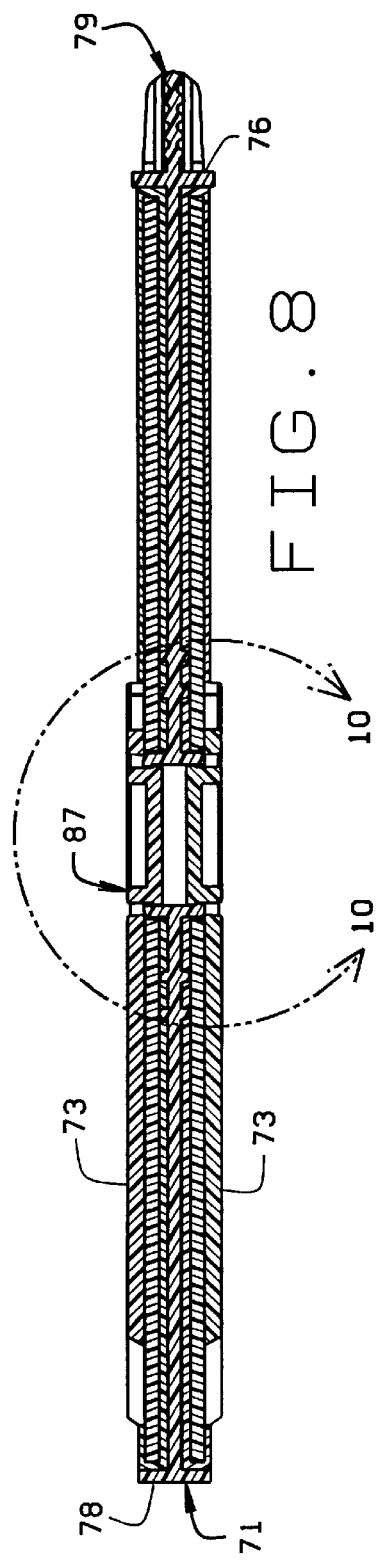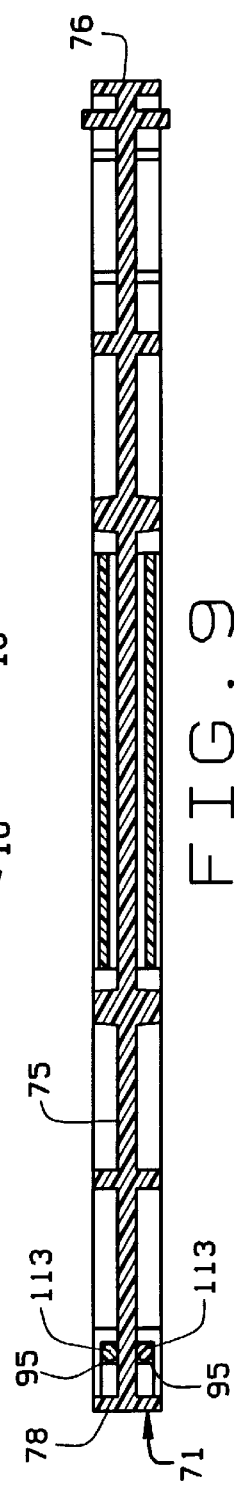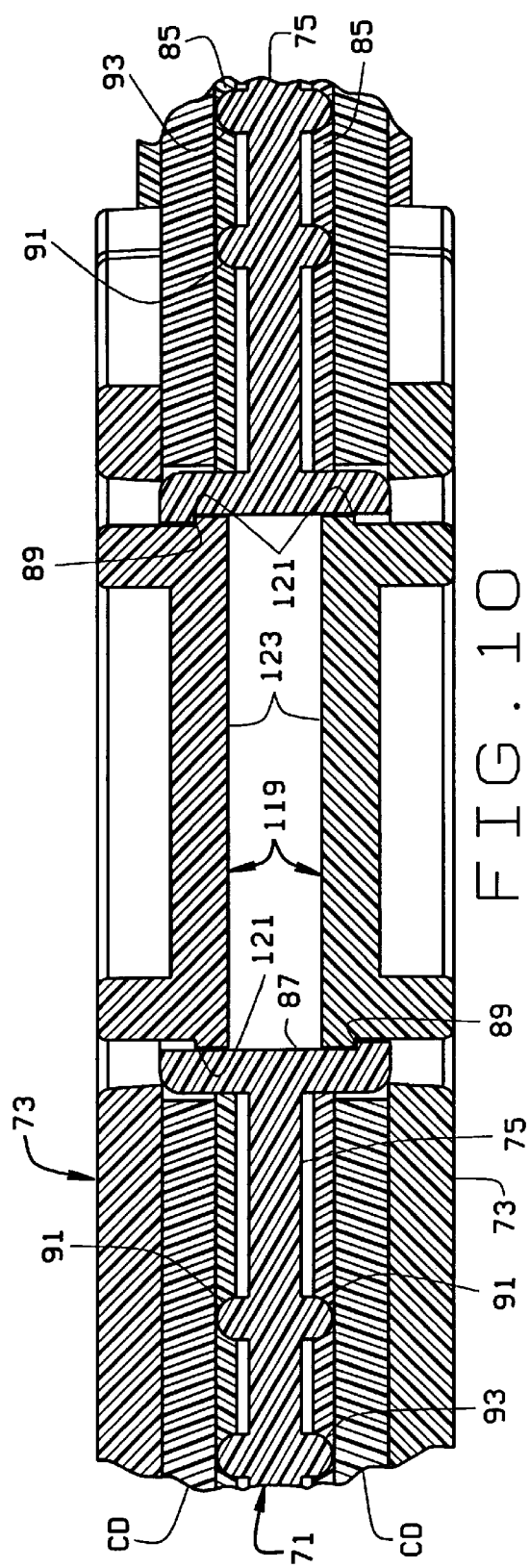

COMPACT DISK CASE AND COMPACT DISK HOLDER THEREFORE

CROSS-REFERENCE TO RELATED APPLICATIONS

Not Applicable

STATEMENT REGARDING FEDERALLY SPONSORED RESEARCH OR DEVELOPMENT

Not Applicable.

BACKGROUND OF THE INVENTION

This invention relates to holders or cases for compact disks and diskettes, and, in particular, to a streamlined or thin case which can hold up to 12 compact disks and several diskettes.

Computer programs are more and more frequently being provided on compact disks (CDs). Often the CD is required for operation of the program. That is, the CD contains information which is required for operation of the program. For example, a commonly used CD is a dictionary or encyclopedia, wherein the data for the program is contained on the CD. However, such CDs which are required for the operation of a program are often kept in a drawer with other CDs and diskettes which are required only to load a program onto a computer's hard disk. Generally, a computer user will need to have only a few CDs and diskettes handy for normal day-to-day use. Obviously, the CDs that may be needed will vary from user to user. However, the computer users need to have an easy way to organize the often used CD's so that the CDs are easily accessible. Merely placing the CDs in a traditional disk box is not desirable because the CD will be placed on its edge and can have its information bearing surface in contact with other CDs or parts of the box. All this can damage the CD, ultimately making the CD unusable. Leaving the CD in its jewel box will protect the CD. However, not all executable CDs are provided with jewel boxes. Further, for those that are, there is still the need to organize them in some manner so that they be easily accessible.

CD containers are available which allow a computer user to put CDs together in one location. However, the trays which hold the CDs in the containers are designed around the conventional hub or rosette of conventional jewel boxes. That is, the trays engage the hole or inner edge of the CD to hold the CD in the tray. The forces applied by the hub to a CD which is used daily, and may be placed in, and taken out of, the tray several times a day, may ultimately damage the CD. Although there is no information on the CD at the inner edge of the CD, if the inner edge of the CD is damaged, the CD may none-the-less be rendered unusable.

BRIEF SUMMARY OF THE INVENTION

A primary object of the present invention is to provide a CD/diskette case which will hold several CD's and diskettes.

A further object is to provide such a case which can be mounted to a computer monitor.

Another object is to provide such a case which is relatively thin or short.

Another object is to provide such a case which is stackable;

Yet another object is to provide a new tray for the case which will hold the CDs.

Another object is to provide such a tray which will hold the CD's without positively engaging the CDs.

Another object is to provide such a drawer which can hold two CDs in a relatively thin space.

These and other objects will become apparent to those skilled in the art upon a review of the following disclosure and accompanying drawings.

Briefly stated, a compact disk/diskette case is provided. The case includes a central section which removably receives a plurality of CD drawers, a top section which defines at least one bay sized to received a standard 3.5" diskette, and a bottom section which slidably receives a storage drawer. The central section includes side walls, a back wall, a bottom wall, and a top wall which together define an open front compartment sized to receive the CD drawers. The center section preferably includes a divider to divide the compartment into two compartments. The CD drawers are thus arranged in at least two columns. Similarly, the top (diskette holding) portion of the case defines at least two bays which hold diskettes. Preferably, the case includes adhesive feet on its bottom surface to enable the case to be mounted to a computer monitor. This will remove the case from the desk top to free up valuable desk top space.

Each the CD drawer includes a tray and a door. The tray has a boss which is at least partially hollow and is sized to enable a CD to be slidably journaled about the boss. The door is pivotally connected to the tray and has a projection which is received in the hollow portion of the tray boss. The door projection and the tray boss engaging each other to removably hold a CD in the drawer without positively engaging the CD. That is, no portion of the drawer actually holds on to the CD to retain the CD in the drawer. Rather, the CD is retained in the drawer by the interaction between the door post and the tray boss.

The interaction between the door post and the tray boss is a snap engagement. Preferably, the door post includes a rib extending from an outer surface of the post and the tray boss includes a inwardly extending finger on an inner surface of the boss hollow portion. The door post rib and the tray boss finger are respectively positioned to engage each other.

Preferably, the tray has a first side and a second side which are identical to each other to enable the drawer to hold two CDs. The tray thus has two bosses which extend from the tray. The drawer includes a second door on the second side of the tray which is identical to the first door. The second door engages the boss on the second side of the tray to hold the second CD in the tray.

The CD drawers are slidably and removably received in the housing. Preferably, the center section side walls have vertically spaced apart tracks or rails on which the drawers slide. To prevent the CD drawer from inadvertently falling out of the case, such as when the case is tipped, the drawer is provided with flexible arms on the tray side walls. The arms each have an outwardly extending finger. The arm fingers cooperate with an inwardly extending lip on the side walls of the CD drawer compartment to prevent the drawers from falling out of the housing.

BRIEF DESCRIPTION OF THE SEVERAL VIEWS OF THE DRAWINGS

FIG. 4 is a front perspective view of a housing for the case showing the bottom drawer removed from the housing and without the CD drawers;

FIG. 8 a cross-sectional view of the drawer assembly taken along line 8—8 of FIG. 7;

FIG. 9 is a cross-sectional view of the drawer assembly taken along line 9—9 of FIG. 7;

FIG. 10 is an enlarged sectional view taken along line 10—10 of FIG. 8;

Corresponding reference numerals will be used throughout the several figures of the drawings.

DETAILED DESCRIPTION OF THE INVENTION

The following detailed description illustrates the invention by way of example and not by way of limitation. This description will clearly enable one skilled in the art to make and use the invention, and describes several embodiments, adaptations, variations, alternatives and uses of the invention, including what we presently believe is the best mode of carrying out the invention.

Figure 1:
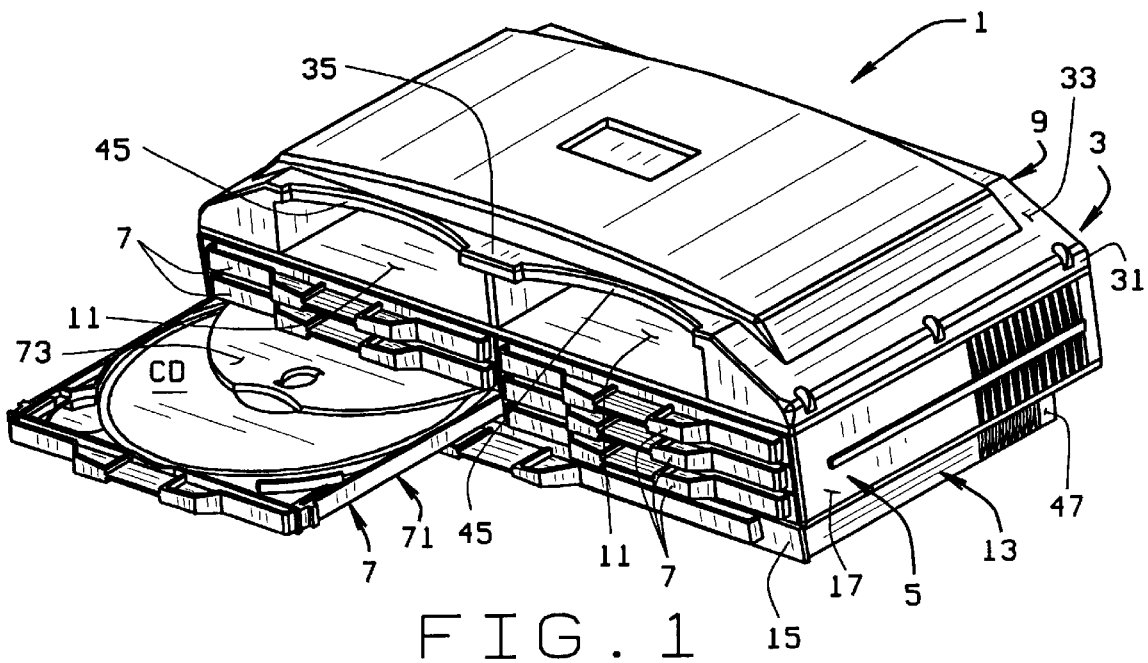
FIG. 1 is a top perspective view of a CD/diskette case of the present invention.
Figure 2:
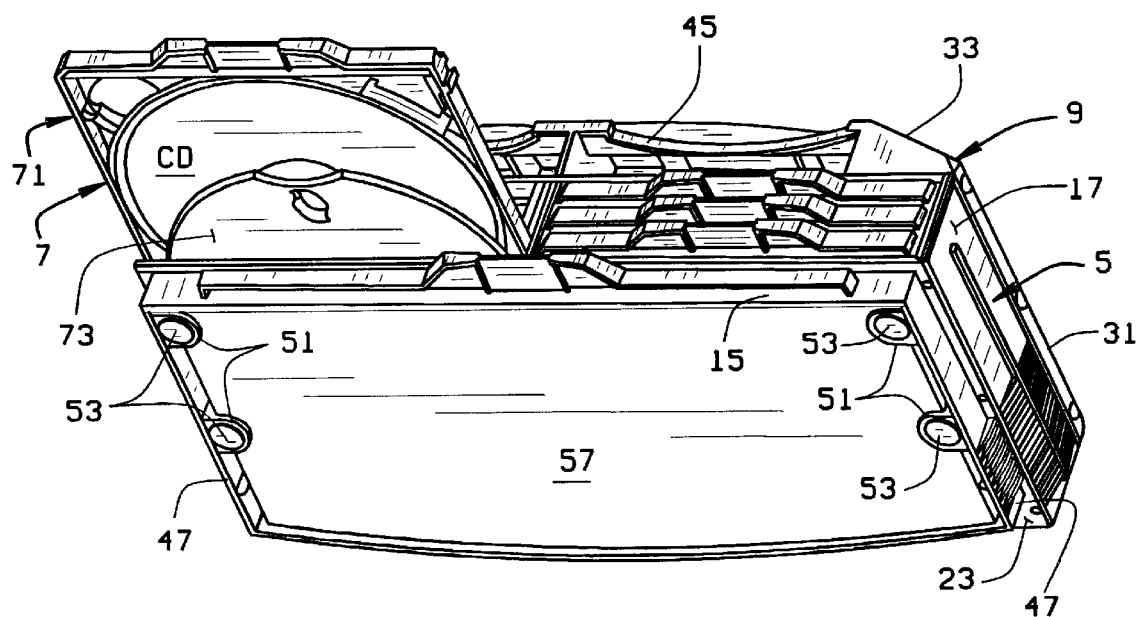
FIG. 2 is a bottom perspective view of the case.
Figure 3:
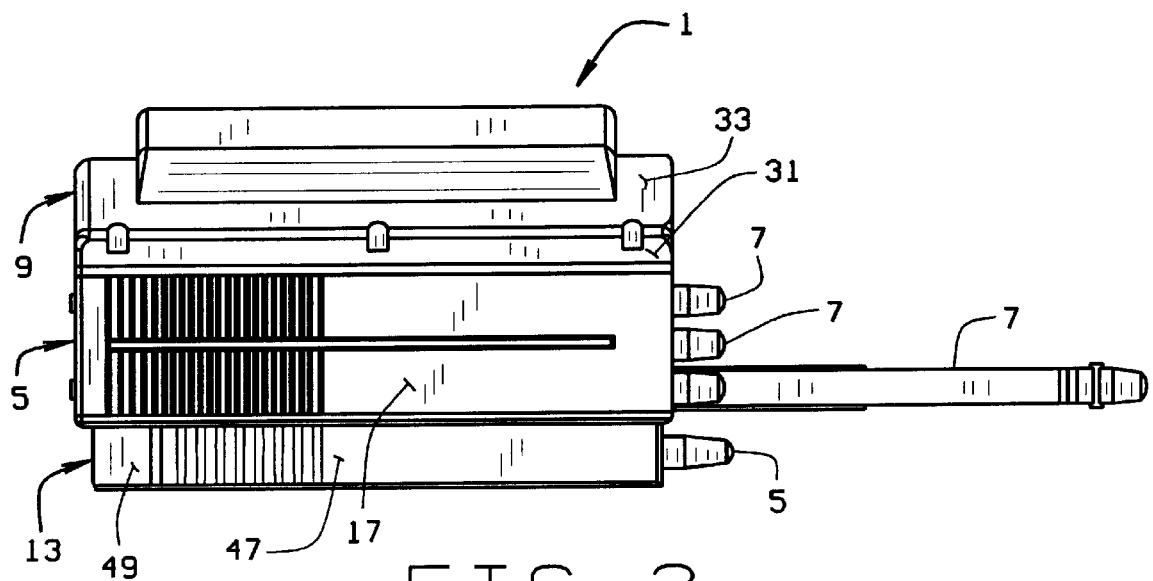
FIG. 3 is a side elevational view of the case.

A CD/diskette case 1 of the present invention is shown generally in FIGS. 1–3. The case 1 has a housing 3 comprising a central or middle section 5 which slidably receives a plurality of CD drawer assemblies 7, an upper section 9 which has two bays 11 which hold 3.5" diskettes, and a lower or base section 13 which slidably receives a drawer 15. As can be seen, the CD drawers are arranged in two columns of three drawers each. As will be discussed below, each drawer is capable of holding two CDs. Thus, the case 1 will hold up to 12 CDs. The trays are relatively narrow, preferably only about ¼" in height. Thus, the center section 5 need only be about 1¼" tall. It is therefore very slim. The diskette bays 11 are similarly arranged side by side, to hold a plurality of diskettes in two columns. The bays 11 are sized to hold up to five diskettes each, thus the case 1 can hold up to ten diskettes. Lastly, the bottom drawer 15 is also narrow, sized to hold pens, pencils, paper clips, labels, small instruction manuals provided with CDs, etc. As can be appreciated, the case 1 is not very tall. Preferably, it is only about 3' tall, 10" wide, and 5" deep, making the case 1 streamlined or thin.

The central section 5 has side walls 17, a back wall 19, a top panel 21, a bottom panel 23, a divider 25 positioned midway between the side walls 17, and an opened front 27. The side walls 17 and divider 25 each have generally horizontally extending rails or tracks 29. The rails 29 on the are formed on the inner surfaces of the side walls 17 and on both sides of the divider 25. The rails 29 are vertically spaced apart and define slides on which the CD drawers or trays 7 glide. The rails 29 are spaced apart a distance slightly greater than the height of the drawers 7 so that the drawers may be easily slid over the ribs.

Preferably, the sides, top, bottom, back, and divider panels are all formed separately, and are connected together, for example with screws. However, if desired, they could be molded as a single piece. Further, the sides, top, bottom, and divider panels are all preferably made of plastic, whereas the back panel is made of sheet metal. The back panel, however, could also be made of plastic.

The top section 9 is a one piece unit that is mounted to the central section 5. The top section has small vertical side walls 31 which merge into sloping side walls 33. A planar section 35 extends between the sloping sides walls 33, and a decorative top portion 37 is formed on top of the planar section 35. The top section 9 includes screw holes 39 at the junction of the vertical and sloping side walls 31 and 33. The screw holes accept screws (not shown) which are screwed through the central section top panel 21 and into the side panels 17. As can be appreciated, the panel 21 forms the bottom of the top section 9. The side sections 38 of the top section 9 are generally triangular, as seen in FIG. 4. The inner surfaces 39 of the side sections 38 form the outer side walls of the diskette bays 11. The diskette bays 11 are separated by a divider 43 which extends from the planar section 35 to the panel 21. The bays 11 are each slightly larger than 3.5" from side-to-side to enable 3.5" diskettes to be slipped into and out of the compartments. The compartments are also about 3.5" deep. As best seen in FIGS. 1 and 2, the top panel 35 is recessed, as at 45 to facilitate removal of diskettes from the bays 11.

Figure 5:
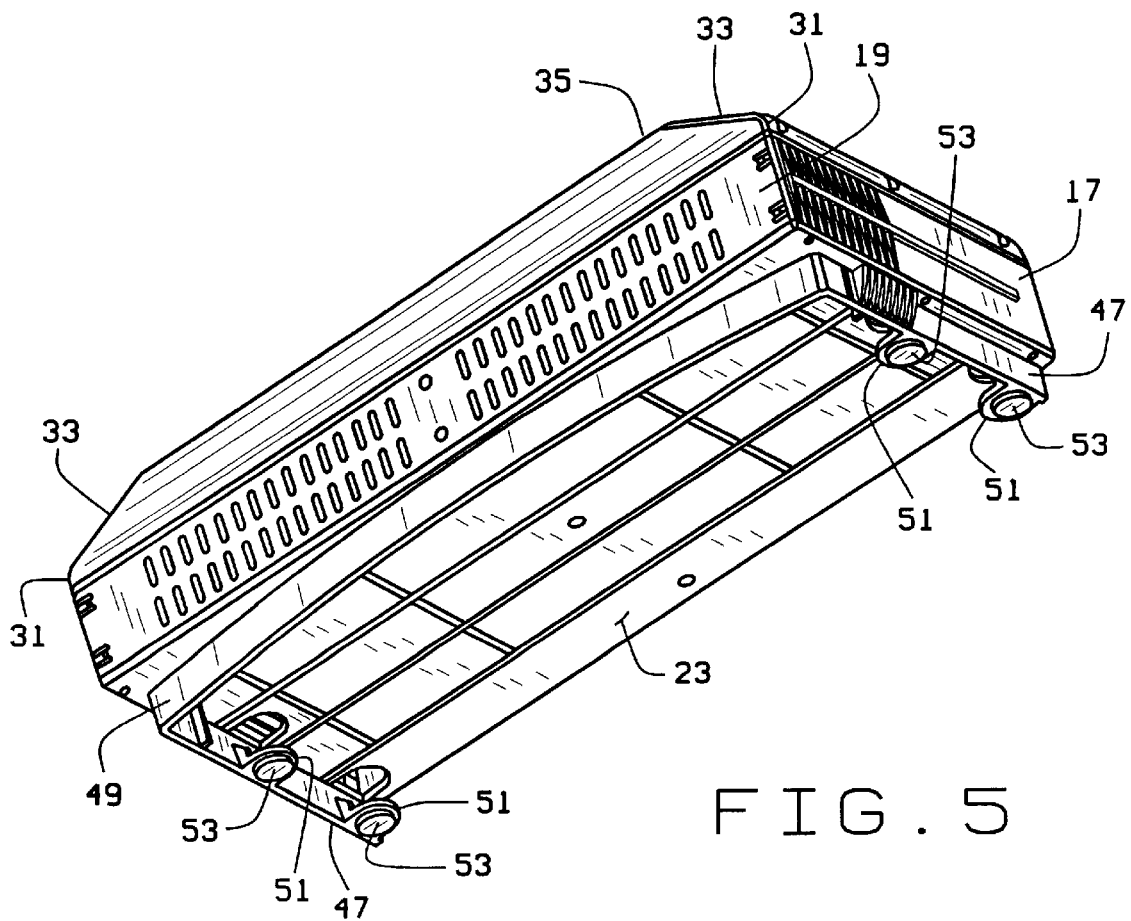
FIG. 5 a bottom rear perspective view of the housing.
Figure 6:
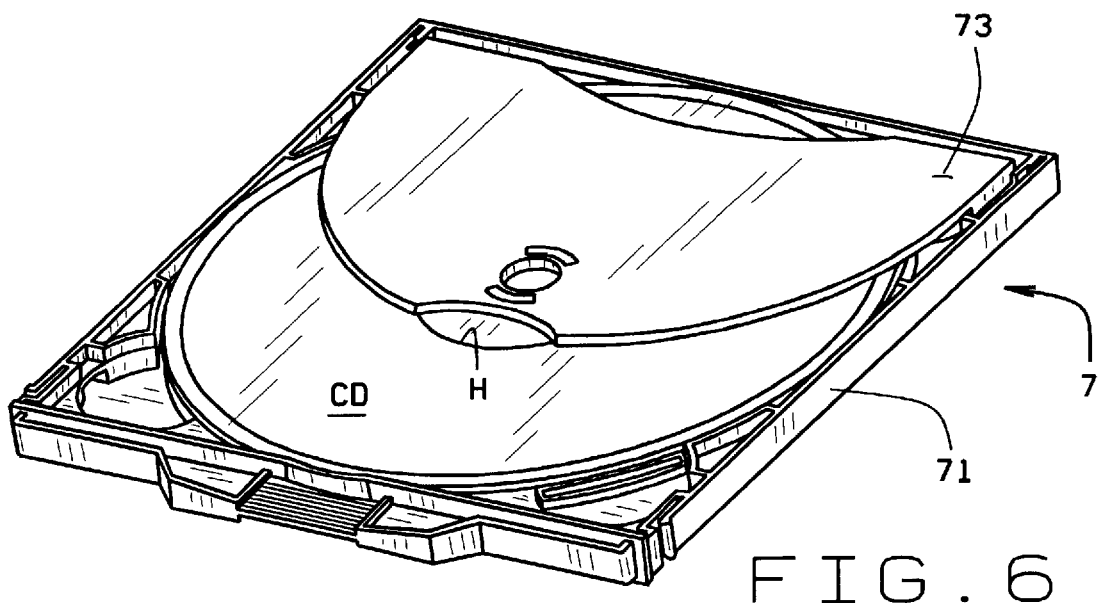
FIG. 6 a perspective view of a drawer assembly used with the housing.

The housing bottom or base section 13 includes legs 47 which extend downwardly from the bottom surface of the central section bottom panel 23. A rear wall 49 extends between the base legs 47. The rear wall 49 is preferably outwardly curved, as seen in FIG. 5. The legs 47 each have two inwardly extending feet 51. One foot is at the front of the base section 13 and the other is approximately half the way to the back of the base section 13. The feet 51 are each provided with pads 53 which have an adhesive bottom. The spacing of the feet 51 and the use of the adhesive pads 53 enable the case 1 to be mounted to a desktop or to the top of a monitor.

The bottom drawer 15 has a bottom panel 57 which slides on the feet top surfaces 55. The drawer is defined by side walls 58, a back wall 59, and a front wall 60, all of which extend up from the drawer bottom panel 57. The back wall 59 is curved. The curvature of the drawer back wall 59 corresponds to the curvature of the base rear wall 49. The side walls 58 are spaced apart from each other a distance slightly less than the distance between the base legs. The drawer front wall 60 overhangs the drawer side walls 58, as seen in FIG. 4, and is sized such that the ends of the front wall are generally flush with the outer surfaces of the base legs 47, as seen in FIG. 2. The drawer 15 has a pull or handle 61 extending outwardly from the front wall 60 so that the drawer may be easily slid on the feet tops 55 by a user.

In an alternative, the case 1 can be made stackable. A stackable unit includes the center section 5 and the base section 13. The top section is removed, and the side and back walls of the center section are made taller. In this configuration, a stackable unit can be placed on a surface (such as a desktop or monitor) and a second unit can be placed on top of the first unit. The base section of the second unit will fit within the extended walls of the first unit, and the feet of the second unit will be adhered to the top panel 21 of the first unit. The extended wall of the stackable unit is approximately the same height as the base section 13, thus the walls stacked units will be substantially continuous, to be aesthetically pleasing. That is, there will be no substantial gaps between the walls of the stacked units. In this manner, several units can be stacked, one on top of the other. A case 1 (having the top section 9) can be placed on the top stackable unit to provide a finished set of stacked cases which has the diskette bays 11.

Figure 7:
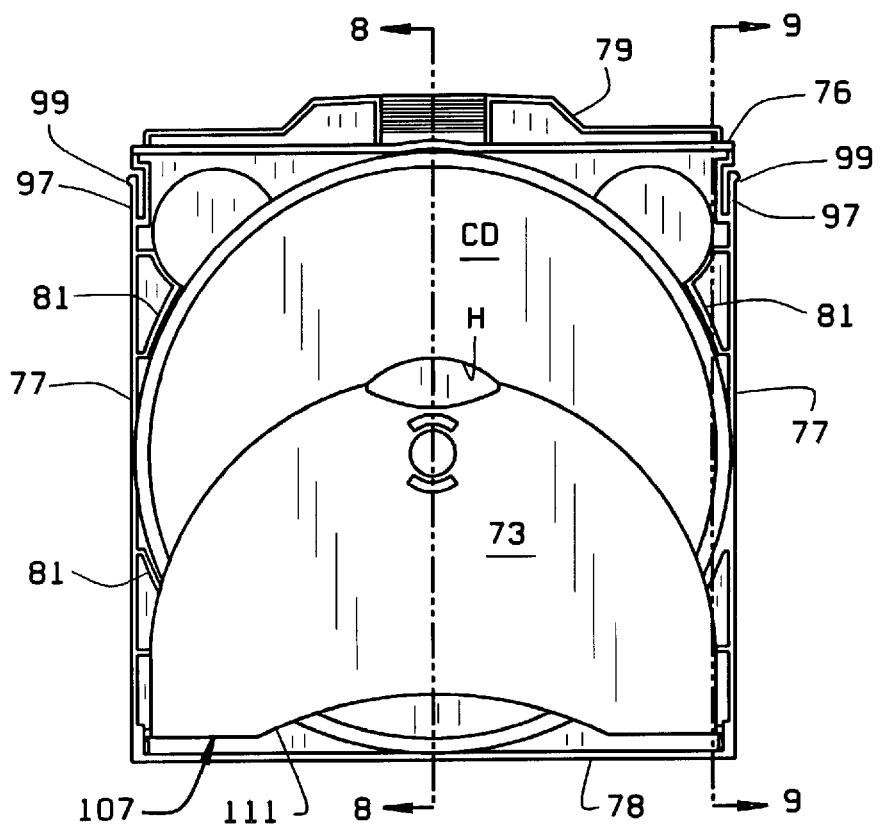
FIG. 7 is a plan view of the drawer assembly.
Figure 11:
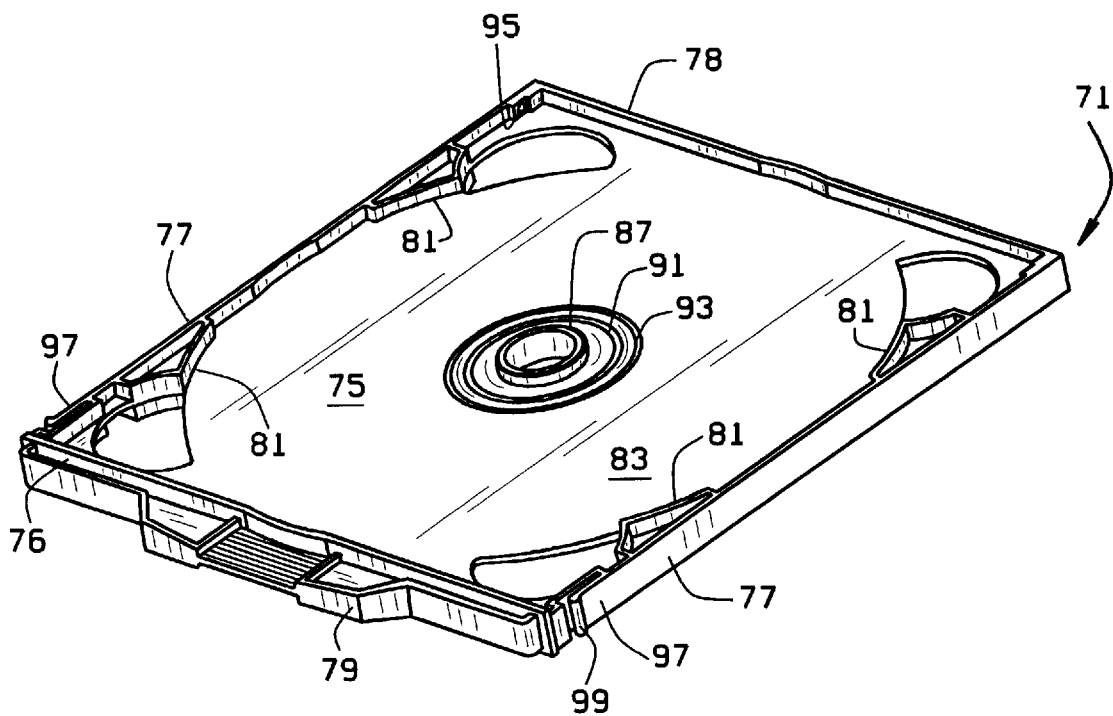
FIG. 11 is a perspective view of a base of the drawer assembly.

The CD drawer 7 is shown in FIGS. 6–11. The drawer 7 includes a tray or base 71 and upper and lower doors 73 which are hingedly mounted to the tray 71. The tray 71 (FIG. 11) includes a plate 75 which is surrounded by a front wall 76, side walls 77, and a back wall 78. A pull 79 is formed on the front wall 76 to facilitate sliding of the drawer into and out of the case central section 5. The walls 76–78 extend above and below the plate 75 a distance slightly greater than the width of a CD as seen in FIGS. 8 and 9. Thus, the plate has a top surface and a bottom surface, which are identical to each other. Arcuate ribs 81 are provided on both sides of the plate 75 to define an area 83 which is slightly larger than a CD so that the a CD may be placed on the tray, as seen in FIG. 7. The tray plate 75 may be lined with a thin felt 85 (FIG. 10) to protect the information bearing surfaces of the CD from the tray.

The tray has a central post 87 which extends from both sides of the tray plate 75. The post 87 has an outer diameter slightly smaller than the inner hole H of a CD, so that CDs may be mounted about the post 87. The post 87 is hollow and has two fingers 89 (FIG. 10), one at the top of the post, and one at the bottom of the post. Preferably, the fingers 89 are spaced apart from each other by about 180°. Although they could be mounted directly in line with each other, spacing the fingers 89 apart makes molding of the plate 75 simpler. The plate 75 includes a pair of concentric ribs 91, 93 spaced radially outwardly of the post 87. The ribs 91 and 93 are provided to elevate the information bearing surface of the CD above the surface of the plate 75. The ribs are positioned such that the inner section of the CD, between the edge of the CD hole H and the inner ring of information on the CD will contact the ribs. Thus, no information bearing portion of the CD will contact the tray 71.

The tray has forwardly opening slots 95 spaced forwardly of the back wall 78 and adjacent the side walls 77. As will be explained below, these slots 95 are provided to hingedly connect the doors 73 to the tray 71. The tray 71 also has a pair of flexible arms 97 having fingers 99 which extend outwardly slightly beyond the side walls 77. The fingers 99 have rearwardly sloping front surfaces. When the CD drawers 7 are inserted into the case 1, the fingers 99 interact with an inwardly directed lip 100 at the front edge of the housing side walls 17 to prevent the CD drawers 7 from inadvertently sliding out of the case 1. A slight pull on the drawer 1 will overcome the force of the tray arms 97 and fingers 99 to enable the drawer to be pulled out of, and pushed into, the case 1.

Figure 12:
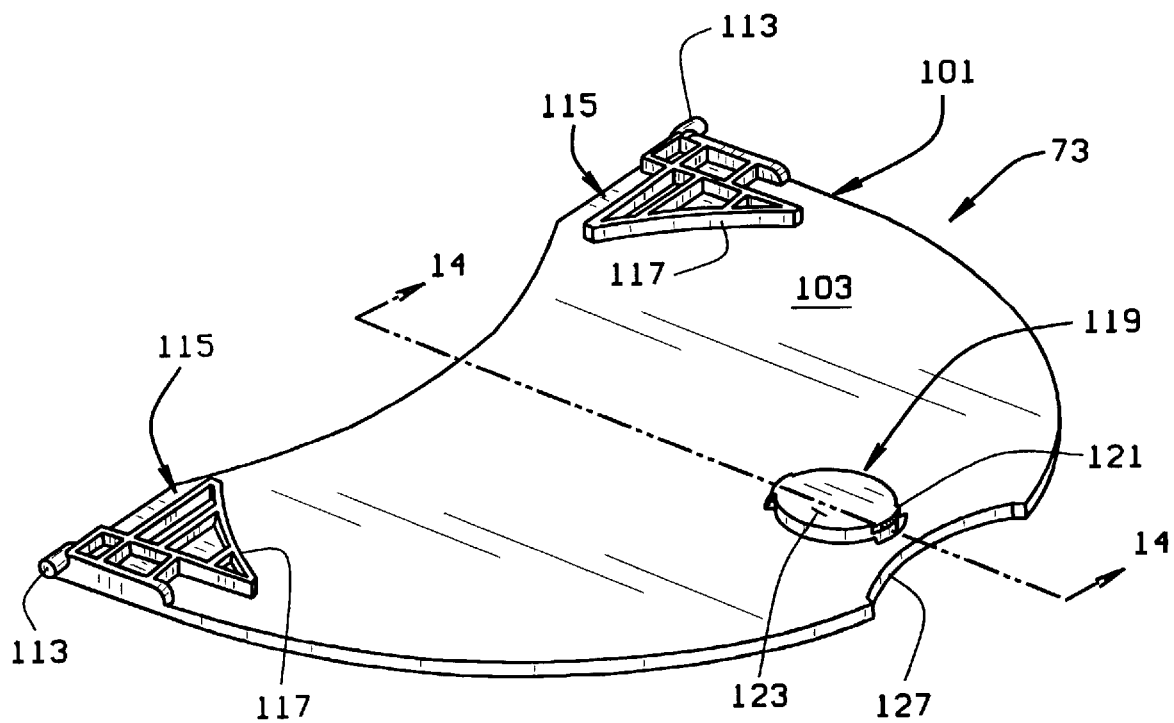
FIG. 12 is a top perspective view of a door of the drawer assembly.
Figure 13:
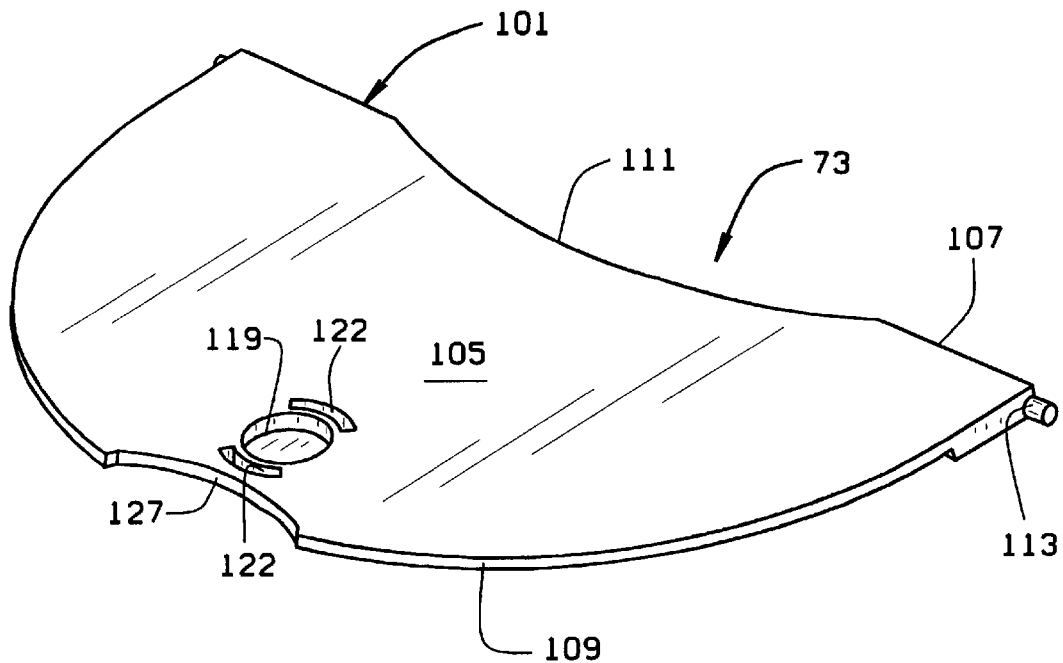
FIG. 13 is a bottom perspective view of the drawer assembly door.
Figure 14:
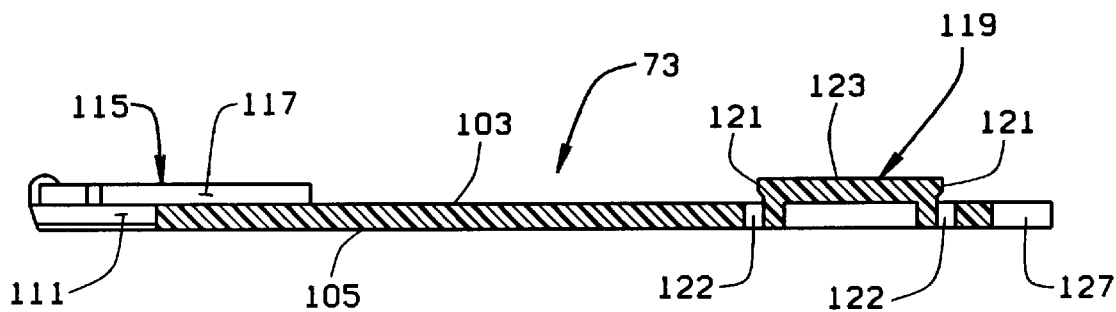
FIG. 14 is a cross-sectional view of the drawer assembly door taken along line 14—14 of FIG. 12.

The drawer doors 73 are shown in more detail in FIGS. 12–14. The doors 73 are identical to each other, and include a door body 101 having a bottom surface 103 and a top surface 105. The doors 73 are generally semicircular in shape and have a back edge 107 and a curved semicircular edge 109. The radius of the door 73 is somewhat greater than the radius of the CD, as best seen in FIG. 7. The door back edge 107 has an arcuate cutout 111 generally in its center. Prongs 113 extend from opposite edges of the back edge 107. The prongs 113 are snappingly received in the tray slots 95 to hingedly or pivotally connect the doors 73 to the tray 71. As seen in FIG. 12, a rib structure 115 is formed on the door's bottom surface 103 at the back corners of the door. The rib structure 115 has a curved inner wall 117 which has a curvature corresponding to the curvature of the CD. When the door is closed, the door wall 117 and the tray walls 81 will help position the CD in the drawer 7.

The door 73 also has a generally circular post 119 spaced slightly rearwardly from the front edge of the door. The post 119 has a pair of ribs 121 extending radially outwardly from the bottom surface 123 of the post 119. Slots 122 are formed in the door body 101 during the formation of the ribs 121. The post 119 is positioned on the door 73 to be received in the tray boss 87 when the door 73 is closed. The ribs 121 are positioned on the post 119 and sized to cooperate with the fingers 89 of the tray boss 87, as seen in FIG. 10, to hold the door 73 in its closed position. The interaction of the post ribs 121 with the boss fingers 87 is a snap interaction. The force of the interaction is easily overcome by lifting up on the door 73 to open the door or by pressing on the door to close it. To facilitate opening the door 73, the an arcuate cutout 127 is formed at the front of the door. As seen in FIG. 7, the cutout 127 exposes a portion of the hole H of the CD. Thus, a user can place a finger in the CD hole to grasp the door without actually contacting the CD.

As noted, the CD rests on the tray plate 75 with its central hole journaled about the tray boss 87. The CD is elevated above the tray plate 75 by the circular ribs 91 and 93 and can be further protected from the plate by the felt pad 85. The door 73 is pivotable between an open position and a closed position. When the door is closed, the rib 121 of the door post 119 interacts with the rib 89 on the inner surface of the tray boss 87. Thus, the CD, unlike conventional jewel cases for CDs, the drawer 7 does not positively engage the CD to hold the CD in the case. Rather, the CD is loosely sandwiched between the doors inner surface 105 and the tray plate 75, and the interaction between the door post and the tray boss will hold the door closed to hold the CD in the drawer. To provide further protection to the CD, the surface 105 of the drawer may also be covered with a felt pad.

Although only one side of the drawer 7 has been described, both sides of the drawer are identical. That is, the tray boss 87 extends above both surfaces of the tray plate 77, and a door 73 is pivotally mounted to both sides of the tray 71. Thus, the drawer can hold two CDs. As noted above, the tray is shallow and the tray walls 76, 77, and 78 have a height only slightly greater than the thickness of a CD. Preferably, the tray walls have a height of about ¼". Similarly, the door 73 is thin so that its outer surface 105 will not extend substantially above the top of the tray walls, as seen in FIG. 8. Thus, the drawer 7 is capable of storing two CDs in a very thin, compact space.

In use, the drawer 7 slides on the housing rails 29. The rails 29 thus act as tracks for the drawers 7. When the drawer is pulled out of the housing 3, the interaction of the door 73 with the tray post 119 will prevent the doors 73 from opening. Thus, a CD on the bottom side of the drawer will be retained in the drawer. To remove a CD from the drawer 73, the drawer is slid out of the case to expose the door 73. The door is then pulled or pivoted upwardly. The CD can then simply be lifted out of the tray 71. In the case of a CD which is on the bottom side of the drawer 7, the drawer is removed from the case 1 and flipped over. The user can then easily open the door 73 to remove the desired CD from the drawer 7. To secure a CD in the drawer, the CD is simply placed in the tray 71 with its hole H journaled about the tray post 87. The door 73 is then closed and sufficient pressure is exerted on the door until the rib 121 of the door post 119 snaps into place below the tray boss finger 89, as seen in FIG. 10.

In view of the above, it will be seen that the several objects and advantages of the present invention have been achieved and other advantageous results have been obtained. As various changes could be made in the above constructions without departing from the scope of the invention, it is intended that all matter contained in the above description or shown in the accompanying drawings shall be interpreted as illustrative and not in a limiting sense. For example, the rib 121 and the finger 87 of the drawer door and tray can be replaced with a groove and detent, or any other cooperating structures which will hold the drawer door closed. The rib 121 of the door post 119 can be made to be a circumferential rib or lip. The base section could be removed, such that the case 1 does not have the bottom drawer 15. The case 1 can be provided with only one column of CD drawers and one diskette compartment to make the case narrower. Similarly, the case 1 can be provided with more than two columns of drawers and more than two diskette compartments to enable the case to hold more CDs and diskettes. Rather than using the rails 29 as tracks for the drawers 7, the housing sides 17 and the divider 25 can be provided with grooves, and a rib can be provided on the drawer tray 71 which will slide in the housing grooves. Alternatively, the drawers 7 can be provided with grooves which will slide over the rails 29. If desired, the top section can be omitted, to provide a case which holds only CDs. These examples are merely illustrative.

We claim:

1. A compact disk case including a housing which holds a plurality of CD drawers; said housing having side walls, a back wall, a bottom wall, and a top wall defining an open front compartment sized to receive said CD drawers; each said CD drawer including a tray and a door; said tray having a boss which is at least partially hollow and is sized to enable a CD to be slidably journaled about said boss; said door being pivotally connected to said tray and having a projection which is received in said hollow portion of said tray boss; said door projection and said tray boss engaging each other to removably hold a CD in the drawer without positively engaging the CD.

2. The compact disk case of claim 1 wherein said tray has a first side and a second side, said first boss being on said first side; said tray base including a second boss on said second side, said second boss being at least partially hollow and sized to enable a second CD to be slidably journaled about said second hub; said first door being pivotally mounted to said first side of said tray, said drawer including a second door pivotally mounted to said tray second side; said second door having a projection which is received in said hollow portion of said tray base second hub; said second door projection and said tray second hub engaging each other to removably hold a second CD in the drawer.

3. The compact disk case of claim 2 wherein the interaction between said door post and said tray boss is a snap engagement.

4. The compact disk case holder of claim 3 wherein in said door post includes a rib extending from an outer surface post and said tray boss includes a inwardly extending finger on an inner surface of said boss hollow portion; said door post rib and said tray boss finger being respectively positioned to engage each other.

5. The compact disk case of claim 1 wherein said CD trays are slidably and removably received in said housing.

6. The compact disk case of claim 5 wherein said housing side walls have vertically spaced apart tracks on which said drawers slide.

7. The compact disk case of claim 5 wherein said housing includes a divider to divide said compartment into two compartments; said CD drawers are arranged in at least two columns.

8. The compact disk case of claim 1 including a diskette portion, said diskette portion comprising at least one bay sized to hold a plurality of diskettes.

9. The compact disk case of claim 8 wherein said second portion of said housing includes two bays to hold diskettes in two columns.

10. The compact disk case of claim 8 wherein said diskette portion is positioned above said housing, said housing top wall defining a bottom surface of said diskette bay.

11. The compact disk case of claim 1 including a base to which said housing is mountable; said base including a drawer which is slideably received in said base.

12. The compact disk case of claim 1 including adhesive members on the bottom of said case, said adhesive members being operable to mount said case to a computer monitor.

13. The compact disk case of claim 1 wherein said drawer includes flexible arms on said tray side walls and said housing side walls include an inwardly extending lip, said arms having a finger which extends outwardly from said arms; said arm fingers cooperating with said housing side wall lips to prevent said drawers from falling out of said housing.

14. A compact disk holder which removably receives at least one CD; said CD holder including a tray and a door; said tray having a boss which is at least partially hollow and is sized to enable a CD to be slidably journaled about said boss; said door being pivotally connected to said tray and having a projection which is received in said hollow portion of said tray boss; said door projection and said tray boss engaging each other to removably hold a CD in the holder.

15. The compact disk holder of claim 14 wherein said tray has a first side and a second side, said first hub being on said first side; said tray including a second hub on said second side, said second hub being at least partially hollow and sized to enable a second CD to be journaled about said hub; said first door being pivotally mounted to said first side of said tray, said holder including a second door pivotally mounted to said tray second side; said second door having a projection which is received in said hollow portion of said tray second hub; said second door projection and said tray second hub engaging each other to removably hold a second CD in the holder.

16. The compact disk holder of claim 15 wherein the interaction between said door post and said tray boss is a snap engagement.

17. The compact disk holder of claim 16 wherein in said door post includes a rib extending from an outer surface post and said tray boss includes a inwardly extending finger on an inner surface of said boss hollow portion; said door post rib and said tray boss finger being respectively positioned to engage each other.

* * * * *